G. W. FERDON.
TOWEL SERVICE CABINET.
APPLICATION FILED MAR. 10, 1921.
1,405,194.
Patented Jan. 31, 1922.
3 SHEETS—SHEET 1.
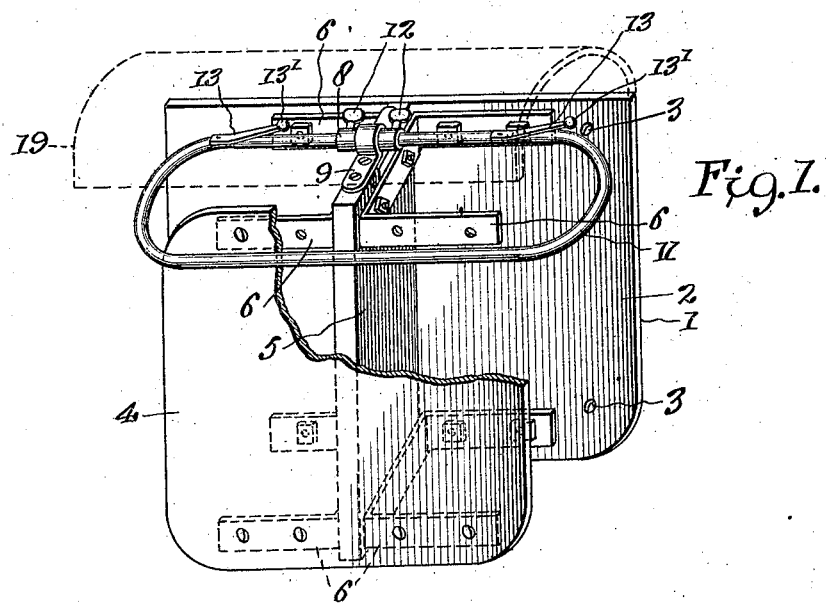
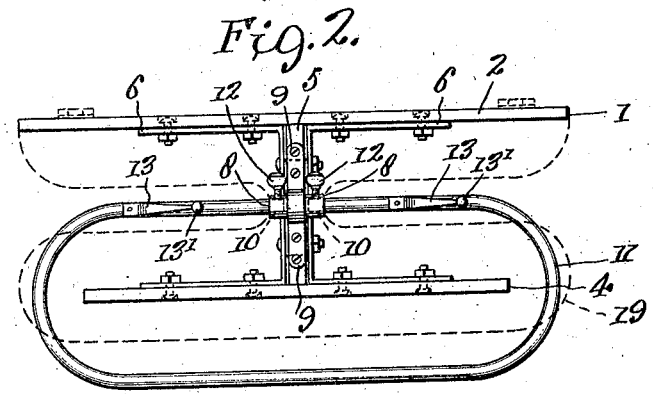
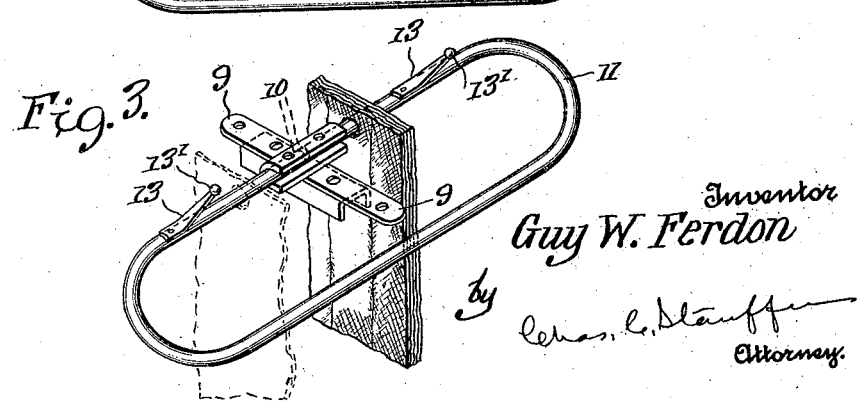
Inventor
Guy W. Ferdon
by
Attorney.

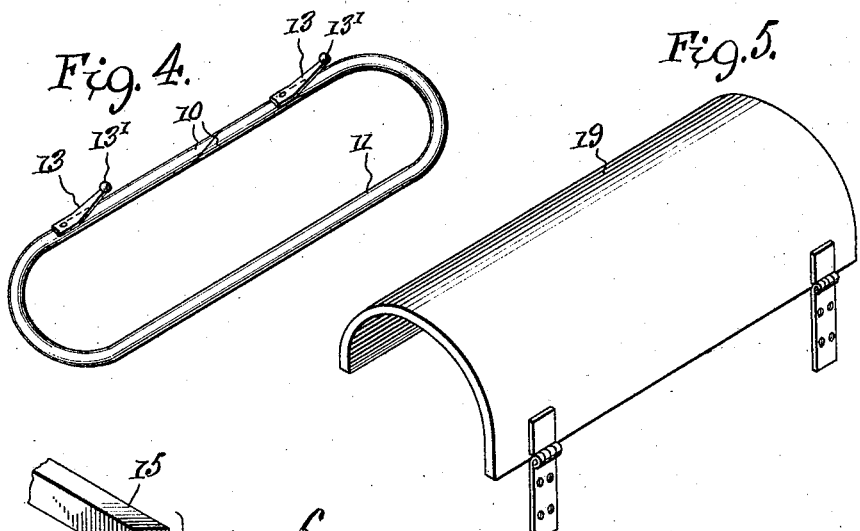
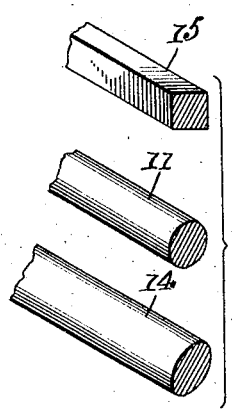
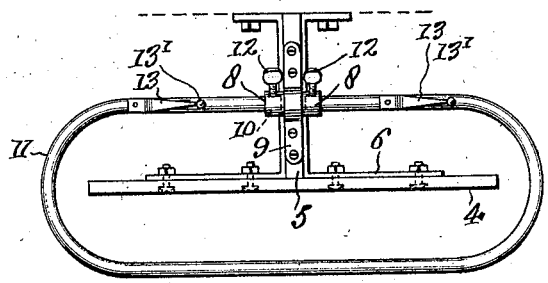
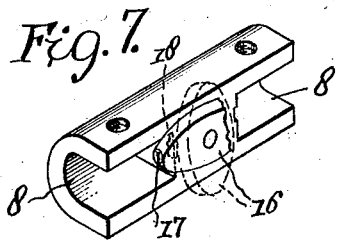
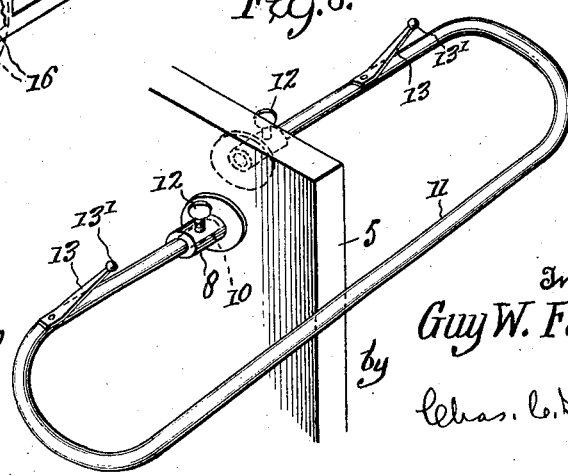
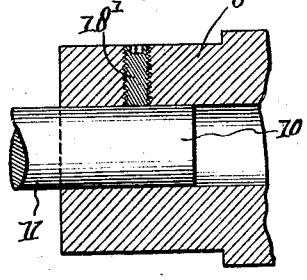

G. W. FERDON.
TOWEL SERVICE CABINET.
APPLICATION FILED MAR. 10, 1921.
1,405,194.
Patented Jan. 31, 1922.
3 SHEETS—SHEET 3.
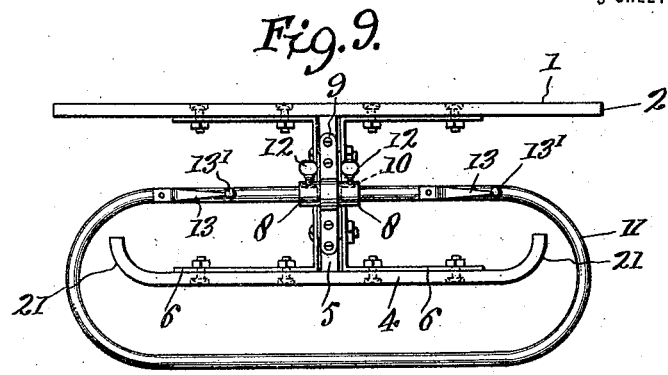
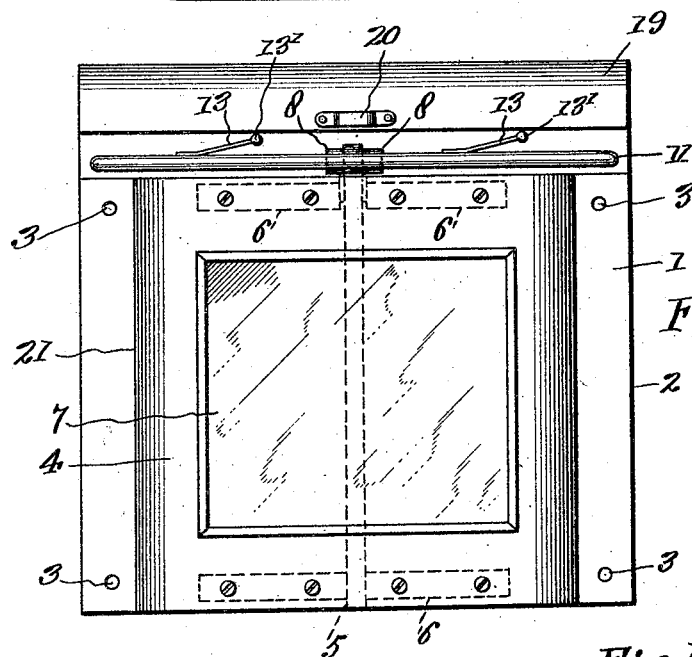
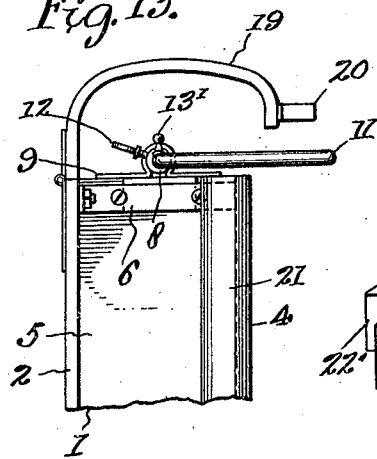
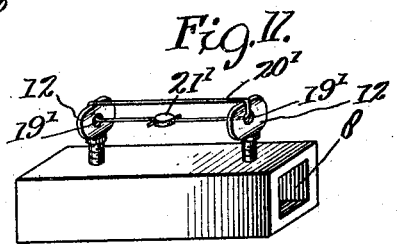
Inventor
Guy W. Ferdon.
by
Attorney.

UNITED STATES PATENT OFFICE.

GUY W. FERDON, OF CRESSKILL, NEW JERSEY.

TOWEL SERVICE CABINET.

1,405,194.   Specification of Letters Patent.   Patented Jan. 31, 1922.

Application filed March 10, 1921. Serial No. 451,202.

*To all whom it may concern:*

Be it known that I, GUY W. FERDON, a citizen of the United States, residing at Cresskill, county of Bergen, State of New Jersey, have invented certain new and useful Improvements in a Towel Service Cabinet; and I do hereby declare the following to be a full, clear, and exact description of the invention, such as will enable others skilled in the art to which it appertains to make and use the same.

My invention relates to a towel service cabinet, that is a cabinet for holding a supply of towels, kept readily accessible and more or less out of sight, means whereby individual towels may be successively brought into position for use, and after use may be successively retired from sight, the towels being at all times exposed to circulation of air and being also kept from removal by unauthorized persons or for undesirable use.

My invention contemplates a device wherein a number of fresh towels may be strung upon a rod, used in turn, and ultimately moved upon the same rod to a position from which they may be removed by the service attendant or other authorized person, the towels being kept at all times in such position that air may circulate freely among them and thus keep them dry. Towels when supplied in large quantity, are often damp and clammy. It is my object to provide fresh towels so that they may be subjected to drying influences, as well as to have soiled towels so that they too may be dried.

Another object of my device is to keep the towels from being readily removed or stolen, from public lavatories and places of that kind, and also to keep them from being used for purposes for which they are not intended. It often happens in a public lavatory, that a man will take a fresh towel, if he is not observed, to wipe the dust off his boots, or to wipe his hat, or to do other things with it for which a towel is not intended. It not infrequently happens that careless or lazy attendants of such places will use a fresh or soiled towl to wipe up the floor. My device protects the towels from such use.

My towel service cabinet is adapted for use in the wash rooms of public places, such as railway stations, hotels, shops and offices, on Pullman cars, etc., and also for use in private homes. Not only are fresh towels kept from unlawful use but the soiled towels as well.

My invention is illustrated in the accompanying drawings, in which:

Figure 1 is a perspective view of my whole device with part of the front broken away and the bent over top indicated by dotted lines.

Fig. 2 is a top view.

Fig. 3 is a perspective of my ring and sockets.

Fig. 4 is a view of a ring of another form.

Fig. 5 is a view of an arched cover which I may employ.

Fig. 6 is a view showing rods of various cross section which I may employ for my ring.

Fig. 7 is a view of another form of socket.

Fig. 8 is a view of another form of ring.

Fig. 9 is a top view showing a modification of the front piece.

Fig. 10 shows the same in front view.

Figs. 11 and 12 are views of different forms of locking devices for locking my ring in position while in use.

Fig. 13 is an end view of the device shown in Figs. 9 and 10;

Fig. 14 is a view somewhat enlarged showing a socket with a safety set screw; and Figure 15 is a plan view of the cabinet shown in Figs. 1 and 2, with the back piece omitted.

In the drawings, 1 represents my cabinet as a whole, 2 the back piece of the cabinet having holes 3 by which it may be screwed to a wall or door, 4 is the front piece, 5 the partition separating the front and back pieces. It will be seen that this partition is placed about midway of the front and back pieces and forms two chambers enclosed on three sides; each is open at the bottom and one side. There may or may not be a top or cover.

In the form shown in Figure 1, I show the front and back pieces, as well as the partition, made of wood, and the parts are separated and kept in position by angle or U-shaped irons 6 at the bottom and top. I may make the front and back pieces, as well as the partition of galvanized iron, or other suitable metal or material, soldered or brazed at the joints, or it may, of course, be enameled wood or iron, or even, if desired, nickel plated.

I may provide a mirror 7, as shown in

Figure 10, if desired, or I may elongate the back upwardly and place a mirror thereon.

On the top of the partition, which should be of substantial thickness, I mount a pair of socket pieces or sockets 8, held immovable in place by the strap or brace 9 screwed or otherwise fastened to the top of the partition. Each of these sockets is provided with an opening into which an end 10 of a ring 11 may be thrust, and held by any suitable means, here shown as the thumb screws 12. I may make the two sockets in one piece.

In Figure 1 I show these sockets in line, continuous as one and the ring is continuous or closed.

I use the word "ring" here to express the part 11, which is a rod made of resilient metal bent to form a closed ring, which is shown as flattened at the sides. This part may be elliptical as shown, may be polygonal, may be annular, or of any other desired shape, and the word "ring" is here used in a generic sense.

Upon this ring I prefer to place a spring or prong 13. This is secured to the rod in any suitable way and is a spring pawl-like device. I may have one at each end of the parts of the ring. The towels for such devices are usually provided with a hole, buttonhole-stitched or provided with a grommet and the towels are strung through this hole upon the securing device. The prongs 13 prevent the careless withdrawal or return of a used towel to the group of clean towels, and the one on the left in Figure 1 prevents the careless withdrawal of a soiled towel by some unthinking person. On the free end of each of said prongs 13 I provide an enlargement here shown as a knob 13'. In withdrawing a clean towel, should another one stick to it or should the user unintentionally grasp two or more, as they ride up over the inclined elastic prong and come to the ball 13', they tend to come apart or separate so that the continued withdrawal affects only one towel, thus eliminating the effect of carelessness and saving the towels.

In loading my device the thumb screws 12 in Figure 1, say, are loosened and the ring pushed to the right, preferably until the left hand loop or bend can rest upon the front piece. There may be a gap between the ends of the ring, as shown in Figure 8, through which the towels may be moved and threaded upon the right hand end. This ring may have an oblique or diagonal slit 10, as shown in Figure 4, and the right hand end of the ring may be bent down and the towels threaded accordingly. This form of device is particularly useful because the oblique slit gives to the end of the ring a pointed character, whereby the towels are more easily strung. The towels used in my device are usually supplied by the towel company. They may be eyeletted in a corner or along a side of the towels.

After the towels are strung, the ring is moved to the left in the sockets until the division point of the ring is approximately half way, when the thumb screws are screwed home and locked by one of the locking devices shown in Figures 11, 12 and 14. When a person wants to use a towel he puts his hand over the top of the cabinet or around the edge of the front piece, and draws around the first towel. The prong or pawl 13 readily yields to the passage of a towel but prevents its return. If a second towel sticks to the first, the ball end 13' separates them. After wiping his hands or face the user pushes the towel to the left and around into the left hand compartment, preferably shoving it over the pawl or prong at the left. After all the towels have been used, or when the towel service attendant comes again, he unlocks the thumb screws, loosens them and shoves the ring and its soiled towels to the left. He then removes the accumulated soiled towels by bending down the ring or taking them out through the gap, inserts the left hand end of the ring into its proper socket, shoves it through the sockets, which in the form shown in Figure 9 are in line, and loads again on the right and then proceeds to secure the ring in place.

Instead of having closed sockets and shoving the ring through the sockets in line from left to right and vice versa, I may have a socket of the kind shown in Figures 3 and 7. In Figure 3 the socket is adapted to use in connection with the diagonally slit ring, and the ring, instead of being carried through the socket, is moved in and out sideways, being loaded, and after loading thrust into position.

There is a particular advantage in using sockets of this style and rings of this type in that the loading of the rings may be done at the laundry where the towels are washed and a supply of rings kept on hand, each ring being thrust into use and secured in place without the trouble and delay of unloading and loading along the route of the towel service attendant. This may, of course, also be done with sockets of other types, for instance, the type of that shown in Figure 7.

My ring may be made of rods of various cross section, as shown in Figure 6, and there is a certain advantage sometimes in having a ring made of a rod of an irregular or polygonal cross section, as shown at 14 and 15. As a means of locking I may make a hole 19' through the broad parts of one of both thumb nuts, see Figs. 11 and 12, and through the said holes pass a rod or wire 20', secured with either a slit 21', see Fig. 11, or lock 22', see Fig. 12.

I may mount a turning button 16, as shown in Figure 7, so as to close the openings in the sockets, and this button may be provided with a lock, not shown but indicated by the keyhole 17, whereby the button may be kept from turning, the bolt 18 being thrown by the lock to enter one of the sockets. I may also make my ring secure by employing safety set screws, of the kind shown at 18', Fig. 14, which are provided with polygonal shaped holes in the top into which a key adapted thereto, may be inserted, to turn the screws and unlock the ring 11. These screws may be sunk flush with the surface of the sockets and the holes may be of any desired shape, being preferably of odd shapes, so as not to permit the screws to be turned save by the proper key. I may also make the ring more or less of spiral shape, as indicated in Figure 8, and the sockets 8 would not, of course, in this case be in line. The ring might thus be supported so that it would not turn in the sockets.

I show an arched cover 19, see Figs. 1, 5 and 13, which may be of sheet metal or other material, and may be hinged to the back and adapted to be turned forward to or over the front piece. In this case the cover 19 should be adapted for easy lifting for access to the towels. This can be effected in any suitable way, as by a handle or rib, indicated at 20, see Fig. 13. I may have a flat slotted cover, as indicated in dotted lines in Fig. 2, the corners of the strung towels projecting through.

The front piece may be curved inward, as shown at 21, at each side, see Figs. 9, 10 and 13, so as to aid more or less in keeping the towels from view.

The device is adapted, as stated, to be screwed to a wall or door, though it may be, of course, suspended in any other way, or mounted upon a stand. The back piece may be omitted or skeletonized, as shown in Fig. 15, and the irons 6, or their equivalents, attached directly to a wall, partition, or door. The front piece may also be eliminated partly or wholly. The partition as a separating means between the chambers may be done away with, though some means for keeping the front and back apart and for supporting the ring is necessary. I have shown the front piece smaller than the rear, although this condition may be changed without departing from the spirit of my invention. I have shown locks of various sorts, but it is obvious that other locking means may be employed, if necessary, or none at all. It is understood that in devices of this kind it is sufficient to render the access to the towels for improper use or theft, difficult.

It will thus be seen that I have invented a neat and efficient fool-proof device of simple construction wherein the towels are at all times kept suspended in circulating air, and thus kept dry. This is advantageous. Sometimes in devices of this kind the soiled towels are not removed with that degree of frequency which is desirable. They are dumped into a can or other receptacle and in warm weather are apt to become foul and moldy. They become offensive to smell as well as to sight. This may happen too in warm muggy weather with unused damp fresh towels. By my device all objection of this kind is obviated or removed.

Having thus described my invention, what I claim as new and desire to secure by Letters Patent of the United States, is:

1. A towel service cabinet comprising a bracket adapted to be attached to a wall, door, or other suitable substantially vertical surface, a vertical partition member secured to said bracket and projecting outwards therefrom, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer edge of said partition member, and the opposite loops of said rod projecting on opposite sides of said partition member, with means for clamping the ends of the rod in said sockets.

2. A towel service cabinet comprising a bracket adapted to be attached to a wall, door, or other suitable substantially vertical surface, a vertical partition member secured to said bracket and projecting outwards therefrom, a front piece secured transversely to the outer end of said partition member to form a front wall for the cabinet, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer face of said front piece, and the opposite loops of said rod projecting on opposite sides of said partition member, with means for clamping the ends of said rod in said sockets.

3. A towel service cabinet comprising a bracket having a back piece adapted to be attached to a wall, door, or other suitable substantially vertical surface, said back piece forming the rear wall of the cabinet, a vertical partition member secured to said back piece and projecting outwards therefrom, a front piece secured transversely to the outer end of said partition member to form a front wall for the cabinet, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer face of said front piece, and the opposite loops of said rod projecting on opposite sides of said partition member, with means for clamping the ends of said rod in said sockets.

4. A towel service cabinet comprising a bracket adapted to be attached to a wall, door, or other suitable substantially vertical surface, a vertical partition member secured to said bracket and projecting outwards therefrom, sockets carried by said partition member with their axes transverse to said partition member, a resilient rod bent to form a ring flattened at one side and slit near the center of said flattened side, the abutting ends of said rods engaging in said sockets, and the outer side of said ring projecting beyond the outer edge of said partition member, and the opposite loops of said rod projecting on opposite sides of said partition member, with means for clamping the ends of the rod in said sockets, and a pair of resilient parallel prongs secured to said ring on opposite sides, respectively, of said slit, the two prongs being inclined at an angle to said flattened side of the ring, and being adapted to permit the sliding of the towels along said ring in one direction but to obstruct their movement in the opposite direction.

5. A towel service cabinet comprising a bracket adapted to be attached to a wall, door, or other suitable substantially vertical surface, a vertical partition member secured to said bracket and projecting outwards therefrom, a front piece secured transversely to the outer end of said partition member to form a front wall for the cabinet, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer face of said front piece, and the opposite loops of said rod projecting on opposite sides of said partition member, with means for clamping the ends of said rod in said sockets, and a pair of resilient parallel prongs secured to said ring on opposite sides, respectively, of said slit, the two prongs being inclined at an angle to said flattened side of the ring, and being adapted to permit the sliding of the towels along said ring in one direction but to obstruct their movement in the opposite direction.

6. A towel service cabinet comprising a bracket having a back piece adapted to be attached to a wall, door, or other suitable substantially vertical surface, said back piece forming the rear wall of the cabinet, a vertical partition member secured to said back piece and projecting outwards therefrom, a front piece secured transversely to the outer end of said partition member to form a front wall for the cabinet, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer face of said front piece, and the opposite loops of said rod projecting on opposite sides of said partition member, with means for clamping the ends of said rod in said sockets, and a pair of resilient parallel prongs secured to said ring on opposite sides, respectively, of said slit, the two prongs being inclined at an angle to said flattened side of the ring, and being adapted to permit the sliding of the towels along said ring in one direction but to obstruct their movement in the opposite direction.

7. A towel service cabinet comprising a bracket adapted to be attached to a wall, door, or other suitable substantially vertical surface, a vertical partition member secured to said bracket and projecting outwards therefrom, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer edge of said partition member, and the opposite loops of said rod projecting on opposite sides of said partition member, with means for clamping the ends of the rod in said sockets, and a pair of resilient parallel prongs, each having a rounded knob on the end thereof, secured to said ring on opposite sides, respectively, of said slit, the two prongs being inclined at an angle to said flattened side of the ring, and being adapted to permit the sliding of the towels along said ring in one direction but to obstruct their movement in the opposite direction, and the knobs being adapted, respectively, to automatically separate adhering towels moved in one direction, and to protect the towels from being torn by said prongs when moved in the opposite direction.

8. A towel service cabinet comprising a bracket adapted to be attached to a wall, door, or other suitable substantially vertical surface, a vertical partition member secured to said bracket and projecting outwards therefrom, a front piece secured transversely to the outer end of said partition member to form a front wall for the cabinet, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer face of said front piece, and the opposite loops of said rod projecting on opposite sides of said partition member, with means for clamping the ends of said rod in said sockets, and a pair of resilient parallel prongs, each having a rounded knob on the end thereof, secured to said ring on opposite sides, respectively, of said slit, the two prongs being inclined at an angle to said flattened side of the ring, and being adapted to permit the sliding of the towels along said ring in one direction but to obstruct their movement in the opposite directions, and the knobs being adapted, respectively, to automatically separate adhering towels moved in one direction, and to protect the towels from being torn by said prongs when moved in the opposite direction.

9. A towel service cabinet comprising a bracket having a back piece adapted to be attached to a wall, door, or other suitable substantially vertical surface, said back piece forming the rear wall of the cabinet, a vertical partition member secured to said back piece and projecting outwards therefrom, a front piece secured transversely to the outer end of said partition member to form a front wall for the cabinet, sockets carried by said partition member with their axes transverse to said partition member, a resilient rod bent to form a ring flattened at one side and slit near the center of said flattened side, the abutting ends of said rod engaging in said sockets, and the outer side of said ring projecting beyond the outer face of said front piece, and the opposite loops of said rod projecting on opposite sides of said partition member, with means for clamping the ends of said rod in said sockets, and a pair of resilient parallel prongs, each having a rounded knob on the end thereof, secured to said ring on opposite sides, respectively, of said slit, the two prongs being inclined at an angle to said flattened side of the ring, and being adapted to permit the sliding of the towels along said ring in one direction but to obstruct their movement in the opposite direction, and the knobs being adapted, respectively, to automatically separate adhering towels moved in one direction, and to protect the towels from being torn by said prongs when moved in the opposite direction.

10. A towel carrying ring for use in apparatus of the character described, comprising a resilient rod bent to form a ring having one of its sides flattened, the ring being slit at the approximate center of said flattened side, and a pair of resilient parallel prongs secured to said ring on opposite sides, respectively, of said slit, the two prongs being inclined at an angle to said flattened side of the ring, and being adapted to permit the sliding of the towels along said ring in one direction but to obstruct their movement in the opposite direction.

11. A towel carrying ring for use in apparatus of the character described, comprising a resilient rod bent to form a ring having one of its sides flattened, the ring being slit at the approximate center of said flattened side, and a pair of resilient parallel prongs secured to said ring on opposite sides, respectively, of said slit, the two prongs being inclined at an angle to said flattened side of the ring, and each prong being provided with a knob at the free end thereof, said prongs being adapted to permit the sliding of the towels along said ring in one direction but to obstruct their movement in the opposite direction, and said knobs being adapted to automatically separate adhering towels when moved along said ring.

12. A towel carrying ring for use in apparatus of the character described, comprising a resilient rod bent to form a ring having one of its sides flattened, the ring being diagonally slit at the approximate center of said flattened side, and a resilient inclined prong secured to said ring near said slit, the said prong being provided with a knob at its free end, whereby to permit the sliding of the towels along said ring in one direction, and to automatically separate adhering towels when so moved, but to obstruct their movement in the opposite direction.

13. A towel carrying ring for use in apparatus of the character described, comprising a resilient rod bent to form a split ring, and a pair of resilient parallel prongs secured to said ring on opposite sides, respectively, of said split, the two prongs being inclined at an angle to said flattened side of the ring, and being adapted to permit the sliding of the towels along said ring in one direction but to obstruct their movement in the opposite direction.

14. A towel carrying ring for use in apparatus of the character described, comprising a resilient rod bent to form a split ring, and a pair of resilient parallel prongs secured to said ring on opposite sides, respectively, of said split, the two prongs being inclined at an angle to said flattened side of the ring, and each prong being provided with a knob at the free end thereof, said prongs being adapted to permit the sliding of the towels along said ring in one direction but to obstruct their movement in the opposite direction, and said knobs being adapted to automatically separate adhering towels when moved along said ring.

15. A towel carrying ring for use in appearance of the character described, comprising a resilient rod bent to form a split ring, and a resilient inclined prong secured to said ring near said split, the said prong being provided with a knob at its free end, whereby to permit the sliding of the towels along said ring in one direction, and to automatically separate adhering towels when so moved, but to obstruct their movement in the opposite direction.

16. A towel service cabinet comprising a bracket adapted to be attached to a wall, door, or other suitable substantially vertical surface, a vertical partition member secured to said bracket and projecting outwards therefrom, a front piece secured transversely to the outer end of said partition member to form a front wall for the cabinet, sockets carried by said partition member, a resilient rod bent to form a split ring, the adjacent ends of said ring slidably engaging in said sockets, and the outer side of said ring projecting beyond the outer face of said front piece, and the loops of said ring, at either side of the split therein, projecting on opposite sides of said partition member, with means for clamping the ends of said rod in said sockets.

17. A towel service cabinet comprising a bracket having a back piece adapted to be attached to a wall, door, or other suitable substantially vertical surface, said back piece forming the rear wall of the cabinet, a vertical partition member secured to said bracket and projecting outwards therefrom, a front piece secured transversely to the outer end of said partition member to form a front fall for the cabinet, sockets carried by said partition member, a resilient rod bent to form a split ring, the adjacent ends of said ring slidably engaging in said sockets, and the outer side of said ring projecting beyond the outer face of said front piece, and the loops of said ring, at either side of the split therein, projecting on opposite sides of said partition member, with means for clamping the ends of said rod in said sockets.

18. A towel service cabinet comprising a bracket adapted to be attached to a wall, door, or other suitable substantially vertical surface, a vertical partition member secured to said bracket and projecting outwards therefrom, sockets carried by said partition member, a resilient rod bent to form a split ring, the adjacent ends of said ring slidably engaging in said sockets, and the outer side of said ring projecting beyond the outer edge of said partition member, and the loops of said ring, at either side of the split therein, projecting on opposite sides of said partition member, with means for clamping the ends of said rod in said sockets.

19. A towel service cabinet comprising a bracket having a back piece adapted to be attached to a wall, door, or other suitable substantially vertical surface, said back piece forming the rear wall of the cabinet, a vertical partition member secured to said bracket and projecting outwards therefrom, sockets carried by said partition member, a resilient rod bent to form a split ring, the adjacent ends of said ring slidably engaging in said sockets, and the outer side of said ring projecting beyond the outer edge of said partition member, and the loops of said ring, at either side of the split therein, projecting on opposite sides of said partition member, with means for clamping the ends of said rod in said sockets.

In testimony whereof, I affix my signature.

GUY W. FERDON.